Feb. 16, 1971 C. E. ZWICKERT 3,562,995
COMPONENTS OF STRUCTURES FOR THE ASSEMBLY OF PANELS
Filed Nov. 19, 1968 8 Sheets-Sheet 1
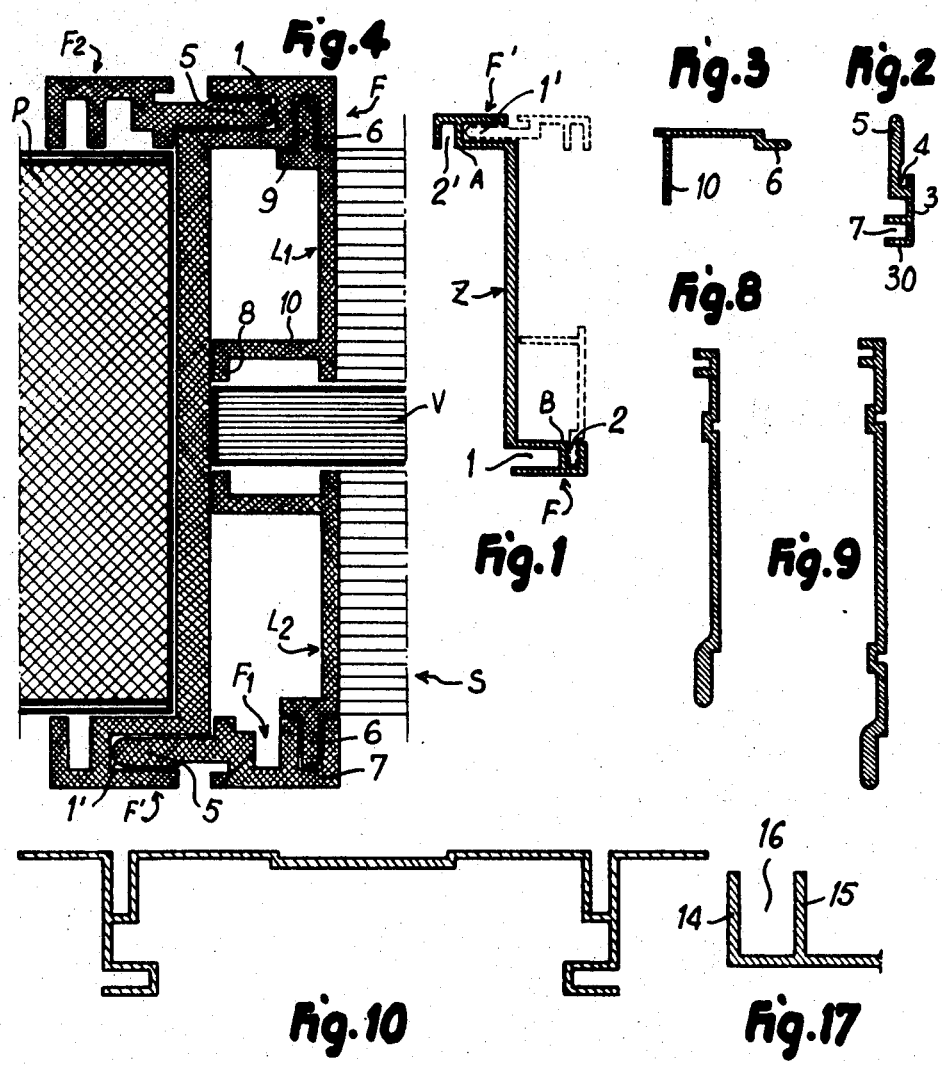
INVENTOR:
CHARLES EMILE ZWICKERT
By Breitenfeld & Levine
ATTORNEYS

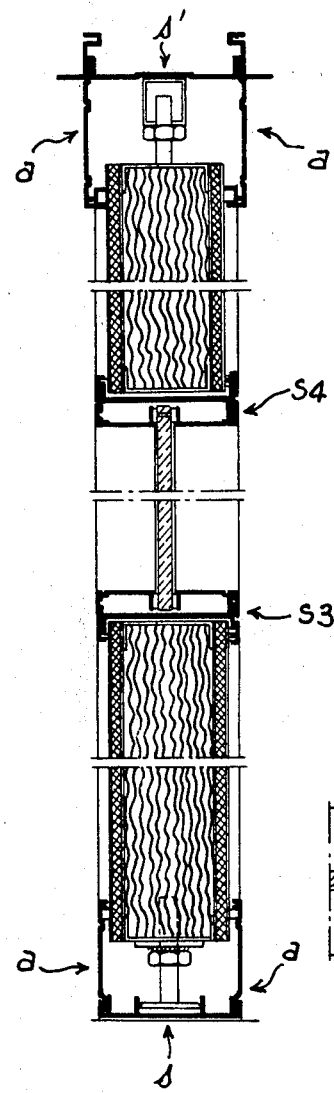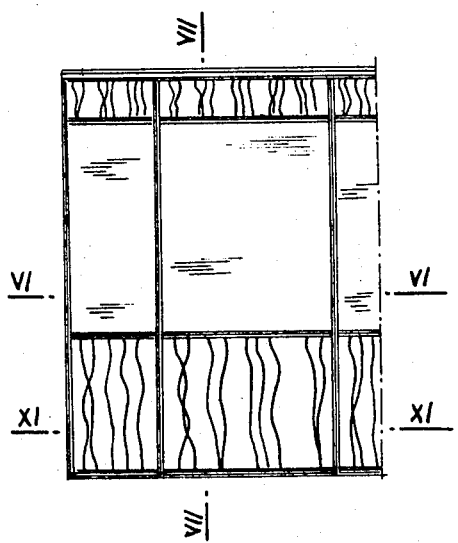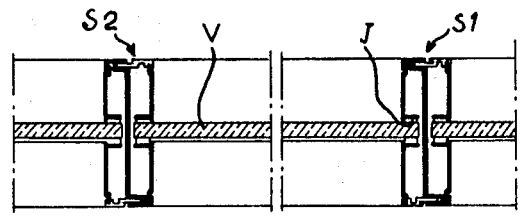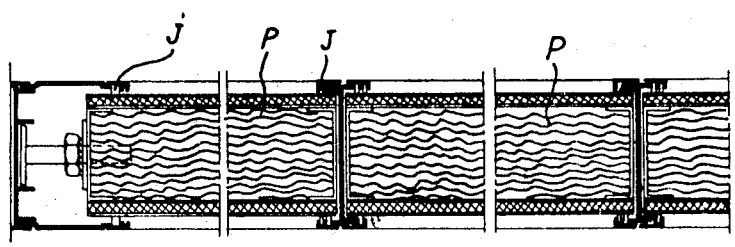

Feb. 16, 1971 C. E. ZWICKERT 3,562,995
COMPONENTS OF STRUCTURES FOR THE ASSEMBLY OF PANELS
Filed Nov. 19, 1968 8 Sheets-Sheet 3
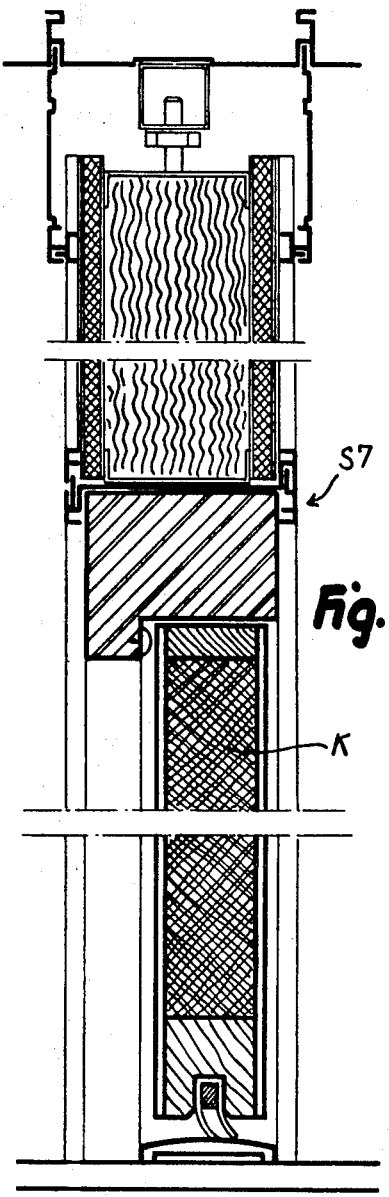
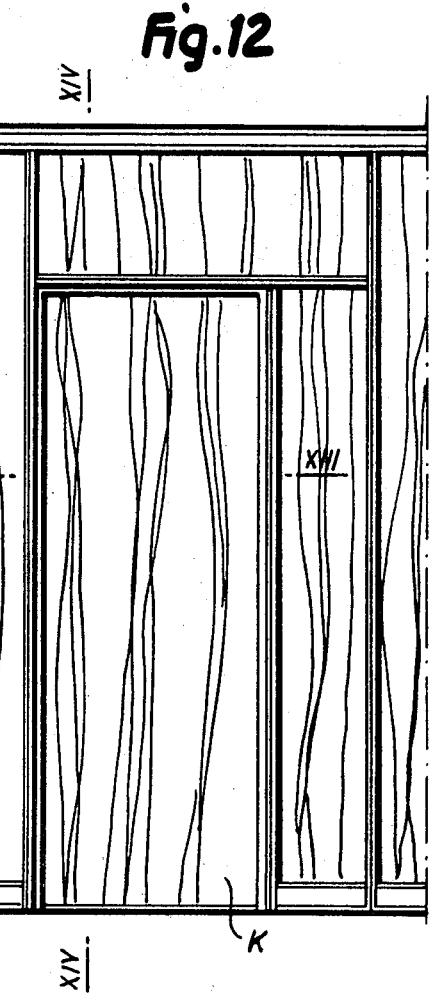
INVENTOR:
CHARLES EMILE ZWICKERT
BY Breitenfeld & Levine
ATTORNEYS

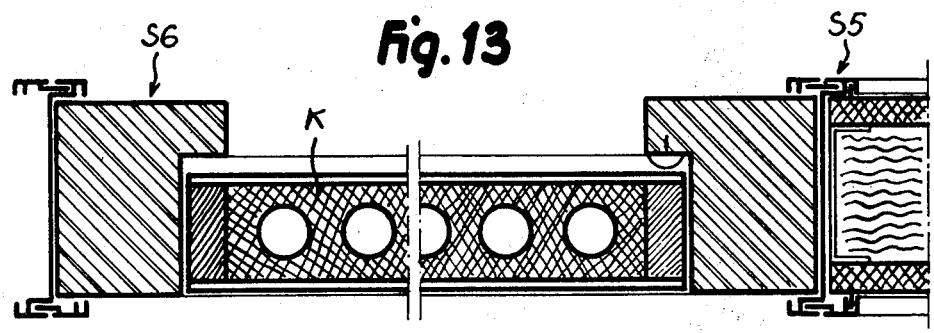
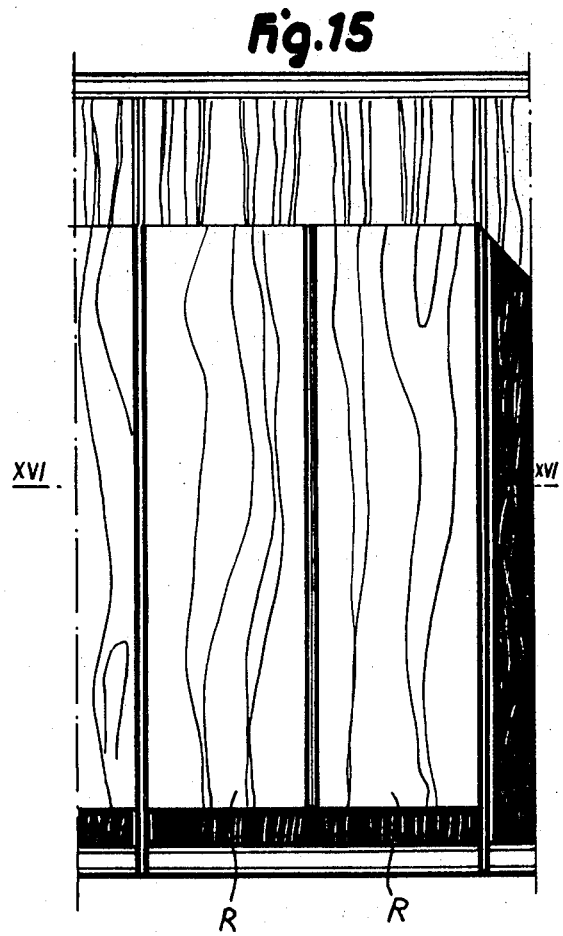

Feb. 16, 1971 C. E. ZWICKERT 3,562,995
COMPONENTS OF STRUCTURES FOR THE ASSEMBLY OF PANELS
Filed Nov. 19, 1968 8 Sheets-Sheet 6
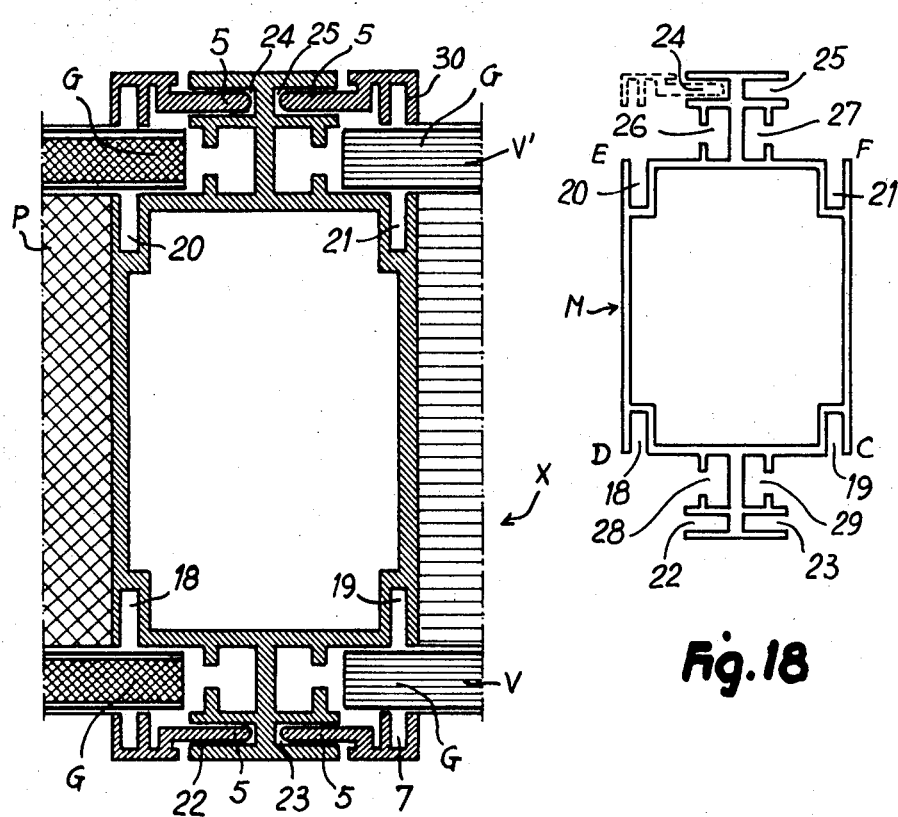
Fig.19  Fig.18
Fig.24
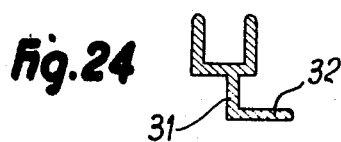
INVENTOR:
CHARLES EMILE ZWICKERT
By Breitenfeld & Levine
ATTORNEYS

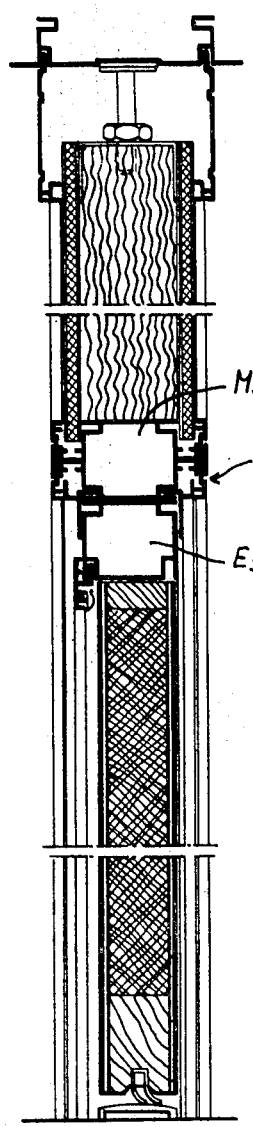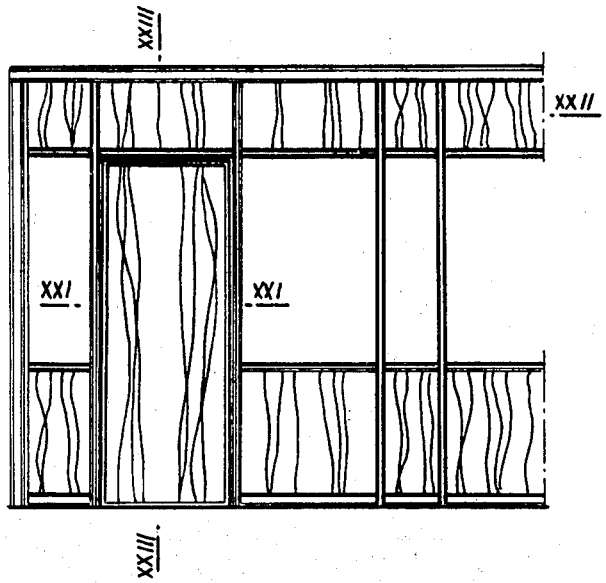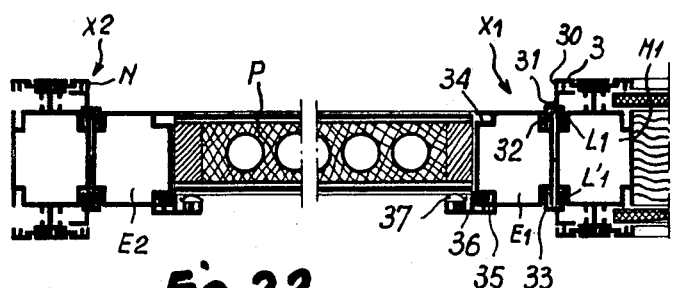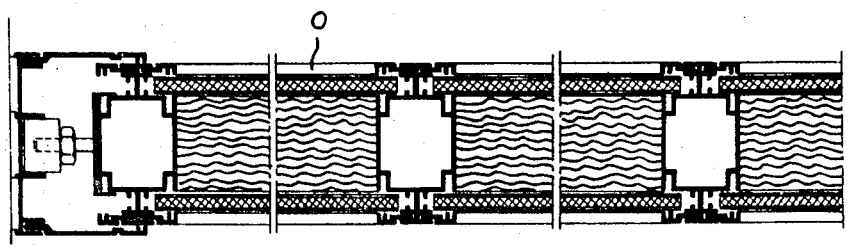

United States Patent Office 3,562,995
Patented Feb. 16, 1971

3,562,995
COMPONENTS OF STRUCTURES FOR THE
ASSEMBLY OF PANELS
Charles Emile Zwickert, 108 Bis, Rue Jean Jaures,
Noisy-le-Sec, France
Filed Nov. 19, 1968, Ser. No. 777,093
Claims priority, application France, Nov. 22, 1967,
129,255
Int. Cl. E04c 3/32, 3/30
U.S. Cl. 52—732                                        9 Claims

ABSTRACT OF THE DISCLOSURE

Member for supporting partition panels has a Z-shaped cross-section. F-shaped end piece at each end of member, cross bars of F being perpendicular to end portion of Z, thereby forming two grooves for accommodating auxiliary members. In alternative embodiment, member has rectangular cross-section formed with two outwardly-facing grooves at the ends of its sides, and two opposite ends have perpendicular extensions comprising back-to-back F-shaped elements.

The invention relates to partition components, more particularly to components of a structure for the assembly of panels for the construction of partitions which can easily be assembled, dismantled or moved.

The aim of the invention, inter alia, is to provide sectional members forming posts in the partition and auxiliary sectional members mounted on the posts so as to frame and hold the panels in the partition. The panels can be of any kind, solid or glazed.

The sectional members according to the invention comprise "assembly" sectional members or posts and "auxiliary" sectional members assembled on the assembly sectional members to firm characteristic structures. The sections of the sectional members will be described hereinafter with reference to the accompanying drawings, in which:

FIG. 1 is a cross-section of a first type of assembly sectional member;

FIGS. 2 and 3 are cross-sections of an F-shaped auxiliary sectional member and of an L-shaped auxiliary sectional member according to the invention;

FIG. 4 is a cross-section of an assembly of panels on a structure comprising sectional members shown in FIGS. 1 to 3;

FIG. 5 is a plan view of a partly glazed partition comprising sectional members of the type shown in FIGS. 1 to 3;

FIG. 6 is a section through the panel shown in FIG. 5 along the plane VI—VI, on an enlarged scale;

FIG. 7 is a section through the panel shown in FIG. 5, along the plane VII—VII, on an enlarged scale;

FIGS. 8 and 9 are cross-sections of sectional members acting as flanges in the partition shown in FIG. 5;

FIG. 10 is a cross-section of a sectional member acting as an upper plinth in the partition shown in FIG. 5;

FIG. 11 is a cross-section of the partition shown in FIG. 5 along the plane XI—XI, on an enlarged scale;

FIG. 12 is a plan view of a partition comprising a door and sectional members of the type shown in FIGS. 1 to 3;

FIG. 13 is a cross-section along the line XIII—XIII in FIG. 12, on an enlarged scale;

FIG. 14 is a section along the plane XIV—XIV of FIG. 12, on an enlarged scale;

FIG. 15 is a plan view of a partition with panels, comprising sectional members of the type shown in FIGS. 1 to 3;

FIG. 17 is a cross-section of an auxiliary sectional member using the partition shown in FIG. 16;

FIG. 18 is a cross-section of an assembly sectional member of a second type;

FIG. 19 is a cross-section of an assembly of panels on a structure comprising a sectional member of the type shown in FIG. 18 and sectional members of the type shown in FIG. 2;

FIG. 20 is a plan view of a glazed partition with a door, comprising sectional members of the type shown in FIG. 18;

FIG. 21 is a section along plane XXI—XXI in FIG. 20, on an enlarged scale;

FIG. 22 is a section along plane XXII—XXII in FIG. 20, on an enlarged scale;

FIG. 23 is a sectio along the plane XXIII—XXIII in FIG. 20, on an enlarged scale;

FIG. 24 is a cross-section of an auxiliary sectional member used in the partition shown in FIG. 21.

FIG. 1 is a cross-section of an assembly sectional member according to the invention.

Figure 16:
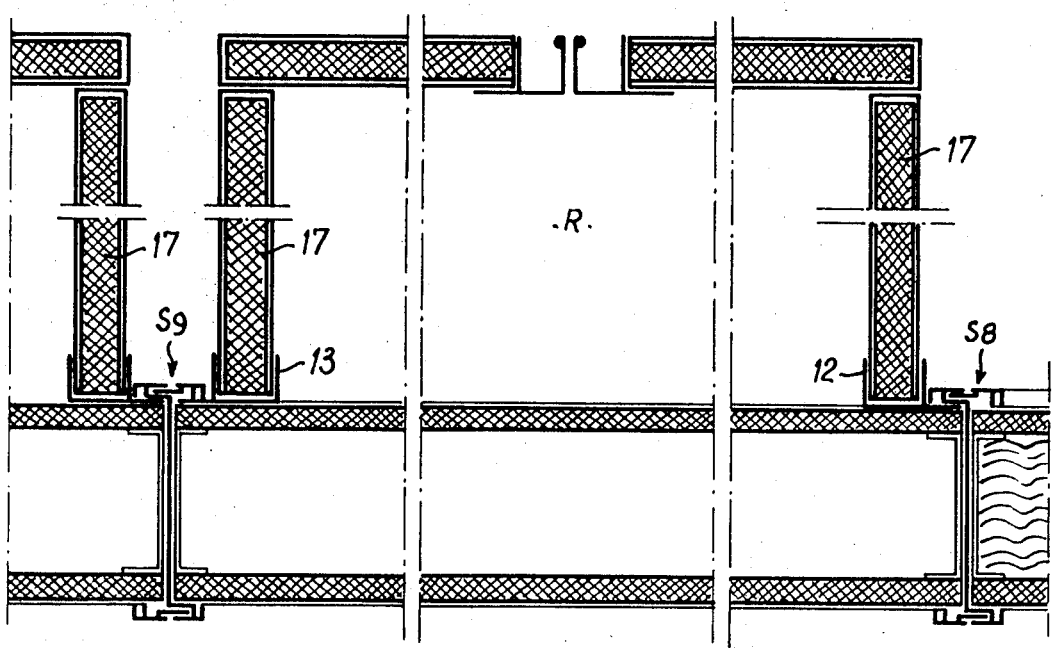
FIG. 16 is a section of the partition in FIG. 15 along plane XVI—XVI, on an enlarged scale.

The cross-section comprises a Z-shaped central part A–B and two F-shaped end parts. The two F's are attached to the Z at A and B respectively by the free ends of their central bars, as shown.

Actually, the Z and the two F's are die-cast in a single piece, and the aforementioned division is made for convenience of description only.

The invention accordingly provides a post forming part of a demountable structure for assembling partition panels, comprising a sectional member having a Z-shaped cross-section, each end of which has a bar extended at right-angles by the inner arm of an F-shaped end-piece, the end-piece comprising an upright or stem and two arms perpendicular to the upright, bounding a groove.

Hereinafter, Z denotes the Z-shaped part of the sectional member and F, F' denote the two parts of the sectional member adjacent to the Z.

Each end of the sectional member is formed with two grooves which are bounded by the two parallel arms of the F and by the upright stroke of the F and the end bar of the Z. In FIG. 1, the grooves are denoted by references 1, 2 respectively for the F and 1', 2' respectively for the F' end.

According to the invention, the two grooves at each end face in directions perpendicular to one another, and the two corresponding grooves 1, 1' and 2, 2' face in opposite directions.

The sectional member has an axis of symmetry through the middle of the Z.

The grooves in the sectional member are used for assembling auxiliary sectional members and gaskets.

FIGS. 2 and 3 are cross-sections of auxiliary sectional members which also form part of the invention.

The sectional member in FIG. 2 is shaped approximately like an F (shown upside down) whose upright stroke or stem 3 is prolonged downwards with a side part 4 and a leg 5 parallel to stroke 3.

The sectional member in FIG. 3 is shaped approximately like an L, one arm of which has an offset extension 6.

FIG. 4, which is a horizontal section of a partition in the neighborhood of an assembly sectional member of the type shown in FIG. 1, shows a characteristic arrangement of the auxiliary sectional members on the assembly sectional member for the purpose of assembling partition panels.

It will be seen that when an F-shaped sectional member of the type shown in FIG. 2 is mounted on a Z-shaped assembly sectional member by inserting its leg 5 in one of the two grooves of the F-shaped part of an assembly sectional member, in the manner shown in the diagram, the F-shaped member is symmetrical with the F in the assembly sectional member with respect to the central plane of the Z. In the assembly shown, auxiliary sectional members of the type shown in FIG. 3 are fitted on the assembly sectional member, either directly by inserting their extension 6 in a groove of an F at the end of the assembly sectional member, or indirectly by inserting their extension 6 in the groove 7 of an auxiliary sectional member of the type shown in FIG. 2, which in turn has its leg 5 inserted in a groove of the assembly sectional member.

It will be seen that in the case shown, the sectional members of the type shown in FIG. 3, used for the assembly shown in FIG. 4, have a butt 8 at the base of an L-shaped arm and a projection 9 on the offset part at the base of extension 6, so that the butt and the projection increase the surface of contact between the said sectional members and the other sectional members in the assembly.

The assembly in FIG. 4 is made as follows, assuming that the assembly sectional member is placed in the desired position for the panel:

Extension 6 of auxiliary sectional member L1 is inserted in the required groove of an end sectional member F at the edge of the assembly sectional member; pane V is placed in contact with arm 10 of sectional member L1; sectional member L2 and auxiliary sectional member F1 are assembled independently, by inserting extension 6 of member L2 into groove 7 of member F1; sub-assembly L2+F1 is placed in position on the assembly sectional member by inserting leg 5 of auxiliary sectional member F1 into groove 1' of sectional member F' at the edge of the Z; panel P is put in position next to the assembly sectional member, and finally, auxiliary sectional member F2 is put in position by inserting its leg 5 into groove 1 of end sectional member F.

As a result, pane V and panel P are assembled in the structure comprising the assembly sectional member and the auxiliary sectional members so that the pane and the panel cannot move transversely with respect to the partition.

A panel or pane can be taken out, merely by sliding away an auxiliary sectional member or a sub-assembly of two auxiliary sectional members mounted on one another.

FIG. 5 is an elevational view of part of a cross-section comprising assembly structures of the type described.

FIG. 6 is a horizontal section through the partition along plane VI—VI, and FIG. 7 is a vertical section through the panel along plane VII—VII in FIG. 5.

In FIG. 6, references S1 and S2 denote the two assembly structures of the same type as structure S in FIG. 4.

A glazed panel V is mounted between structures S1 and S2, which to this end comprise L-shaped auxiliary sectional members. The other sides of these structures are formed similarly.

If necessary, a gasket, made e.g. of strips of cellular material such as Klegecel, is placed next to the arms of the L-shaped sectional members adjacent to the glazed panels. In FIG. 6, the gasket is denoted by reference j.

FIG. 7 shows the partition structure in the vertical plane. As FIG. 7 shows, the partition is of the type comprising stiffening jacks which "stretch" the partition between the ground and the ceiling and an example of which is described in Swiss Pat. No. 431,881 of Mar. 15, 1967 (date of granting) and in Italian Pat. No. 733,237. Flanges a, which are adjacent to bottom shoes s and top shoes s' of the partition, have a special design.

FIGS. 8 and 9 are separate views of variant flanges, and FIG. 10 is a separate view of the upper shoe. These components are sectional members, and are shown in cross-section.

We shall not give further details of the assembly of the Z-shaped members forming a post in the partition, since the methods of assembly are similar to those described in the cited patents.

FIG. 11 is a horizontal section of the panel in FIG. 5, showing a non-glazed part of the panel. The section is along the plane XI—XI in FIG. 5.

FIG. 11 shows that the Z-shaped assembly sectional members or posts for assembling non-glazed panels P only have F-shaped auxiliary sectional members of the type shown in FIG. 2; the grooves in the F-shaped members comprise gaskets j in contact with the panels.

FIG. 7 is a vertical section, but the assembly sectional members can be used horizontally as shown in assemblies S3 and S4, in order to frame solid or glazed panels.

FIG. 12 is an elevational view of a partition having a door K, and FIGS. 13 and 14 respectively are a horizontal section of the partition in FIG. 12 along line XIII—XIII, and a vertical section of the same partition along plane XIV—XIV.

The last-mentioned drawings show the assembly structures S5 and S6 which are used to assemble the door frame, in co-operation with horizontally-disposed assembly structure S7.

FIG. 15 is an elevational view of a partition comprising panels R, the panels being assembled by the assembly structures denoted by S8 and S9 in FIG. 16, which is a horizontal section along plane XVI—XVI in FIG. 15.

The last-mentioned structures comprise auxiliary sectional members including F-shaped members 12 and 13, used for structure S8 and structure S9 respectively. FIG. 17 is a separate cross-section of an F-shaped sectional member of a type comprising a groove 16 between its arms 14 and 15, the groove being sufficiently wide to receive the edge of a side part 17 of the panel.

FIG. 18 is a cross-section of a variant form of assembly posts. The cross-section is approximately a rectangle CDEF formed with grooves at the four corners and having extensions at the middle of two opposite sides and projecting from the rectangle in the form of two F's back-to-back.

More precisely, the invention provides a post forming part of a demountable structure for assembling partition panels, comprising a sectional member having an approximately rectangular cross-section, in which each pair of parallel sides terminates at each end in a corner groove facing outwards on the side, and each side has an extension at right-angles from its centre consisting of the back-to-back uprights of two F-shaped parts each comprising an upright and two arms which are perpendicular to the upright and which bound a groove.

The resulting die-cast sectional member is formed with eight grooves, i.e. four corner grooves 18, 19, 20 and 21 and four grooves 22, 23, 24 and 25 pointing in directions perpendicular to the corner grooves.

Corridors 26, 27, 28 and 29 are also formed along the upright strokes of the double F's and have a reduced opening, the purpose of which will be explained later.

The grooves in the sectional member, like those of the member shown in FIG. 1, are for receiving parts of the auxiliary sectional members and the gasket materials.

FIG. 19, for example, is a horizontal section corresponding to FIG. 4 but in the neighborhood of an assembly post of the type shown in FIG. 18.

As FIG. 19 shows, F-shaped members of the type shown in FIG. 2 have their legs 5 inserted into grooves 24, 25, 22 and 23 of the double F's in the post. When assembled, the auxiliary sectional members have grooves 7 opposite the four grooves 18–21 respectively of the assembly sectional member. The auxiliary sectional members cooperate with the external walls of the corners of the assembly sectional member to form passages G for inserting the edges of panels or panes, as the case may be.

The assembly in FIG. 19 comprises a double pane V, V' at the right and a panel P at the left, but the assembly can be varied if required, e.g. by taking out the pane and replacing it with an opaque plate-like panel, or by leaving the space empty. In the latter case, groove G is advantageously masked by a suitable sectional member, e.g. of the same type as in FIG. 2 but having a top transverse arm 30 extended until it is almost in contact with the opposite corner of the rectangle forming the central part of the assembly post.

FIG. 20 is an elevational view of a partition, comprising assembly posts of the type shown in FIG. 18. The partition comprises glazed parts and a door.

FIG. 21 is a cross-section of the partition in FIG. 10 along a horizontal plane in the glazed region, on an enlarged scale; FIG. 22 is a cross-section of the partition in FIG. 20 along a plane above the door; FIG. 23 is a section across the partition in FIG. 20 along a vertical plane intersecting the door.

The last-mentioned drawings show the assembly posts in structures where the posts are used to assemble auxiliary sectional members in order to assemble other components of the partition. In FIG. 21, for example, structure X1 comprises a post M1 of the type shown in FIG. 18 surmounted by a sectional member E1 for framing a door; connecting members L1 and L1', shown separately in cross-section in FIG. 24, are used for the assembly. Members L1 and L1' are Y-shaped, and the foot of the Y bends at a right-angle. As can been seen in FIG. 21, the non-bent part 31 of the foot of the sectional member is in line with part 30 of an F-shaped auxiliary sectional member whose upright stroke 3 is in line with the top of the double F in whose groove the F is mounted; to an observer, accordingly, the angle in post M1 (like the angle N in post N2 of structure X2) does not appear to have any re-entrant parts.

FIG. 21 also shows that member E1 has a rectangular or square cross-section formed with a groove at each corner, two grooves 32 and 33 corresponding to the corner groove of assembly post M1, and the two other grooves 34 and 35 opening, like the first grooves, outside the sectional member but facing in directions perpendicular to grooves 32 and 33.

A sectional member 36 mounted in groove 35 has a gasket 37 against which door P bears.

FIG. 22 shows the assembly of panels of the type shown on the left side of FIG. 19. The flat appearance of the partition is due to the fact that the panels comprise facings O in the spaces between the F-shaped auxiliary sectional members.

FIG. 23, which is a vertical section through the panel, shows that post M3 of the type shown in FIG. 18 is used in a horizontal position in a structure X3, which comprises a sectional member E3 similar to member E1.

Figure 25:
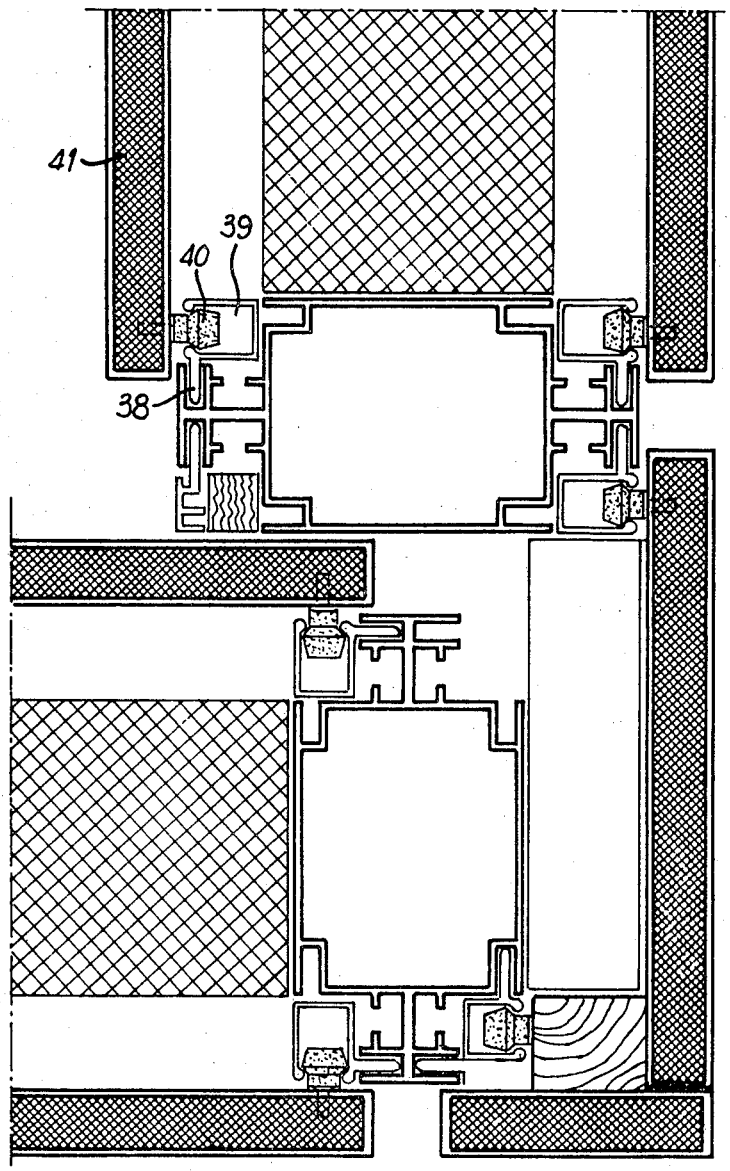
FIG. 25 is a horizontal section of an angle where two partitions are joined together, comprising assembly sectional members of the type shown in FIG. 18.

Finally, FIG. 25, which is a horizontal section showing the angle joining two partitions comprising assembly posts of the type shown in FIG. 18, shows that the posts have U-shaped auxiliary sectional members having one arm whose upper part is prolonged by an extension perpendicular to the arm and pointing outside the U. The member has its extension 38 inserted into the appropriate groove of a double F of the post as shown, so that a lug (or a member of lugs in line) 40 rigid with a panel 41 can be inserted and gripped in the U39 of the sectional member. Panel 41 is thereby gripped by the post.

Obviously, the structures described can be modified in detail to serve different purposes, and the modifications are possible within the spirit of the invention.

I claim:

1. A structure for assembling partition panels, said structure comprising:
(a) a main member of unitary construction including (I) a central portion including a middle planar part and one end of a leg connected at each end of said middle part, each leg being perpendicular to said middle part and said legs extending in opposite directions from said middle part, thus giving said central portion a Z-shaped cross-section, and (II) an end portion connected to the other end of each of said legs, each of said end portions including a stem parallel to its respective leg, an inner arm extending between an intermediate point of said stem and the other end of said leg and being perpendicular and connected to both, and an outer arm parallel to and spaced from said inner arm and connected to said stem, said outer arm being joined to said stem at the end thereof outwardly of the inner arm and away from said central portion, said stem and leg defining a first groove between them, and said inner arm and outer arm defining a second groove between them, said first and second grooves being disposed in right angular relationship, and (b) at least one auxiliary member, having a part slidably accommodated within one of said grooves, for preventing lateral movement of a partition panel located with its edge abutting said middle part of said central portion.

2. A structure according to claim 1 wherein said auxiliary member has an L-shaped cross-section including two arms, one of said arms carrying an extension slidably accommodated within said second groove of one of said end portions, the other arm of said auxiliary member being adjacent to said middle part when said auxiliary member extension is in said second groove.

3. A structure according to claim 1 wherein said auxiliary member has an F-shaped cross-section including a stem and two arms perpendicular to said stem, and including an extension carried by said stem and projecting in a direction away from said arms, said extension being slidably accommodated within said first groove of one of said end portions, said auxiliary member being symmetrical with the other of said end portions about a plane perpendicular to said central portion middle part when said extension is in said first groove.

4. A structure according to claim 3 wherein the arms of said auxiliary member define a third groove between them, and including an additional member having an L-shaped cross-section including two arms, one of said arms carrying an extension slidably accommodated within said third groove, the other arm of said additional member being adjacent to said middle part when said additional member extension is in said third groove.

5. A structure for assembling partition panels, said structure comprising:
(a) a main member of unitary construction including a central portion having a generally rectangular cross-section, means defining a groove at each corner of said central portion, two of said grooves opening on each of two opposite sides of said central portion, an extension projecting from the center of each of said opposite sides, said extension including two parts of F-shaped cross-section, each part having an upright and two arms, the latter defining a groove between them, and the uprights of said F-shaped parts being arranged back-to-back, each groove of said extension being perpendicular to the one of said corner grooves closest to it, and
(b) at least one auxiliary member having a part adapted to be slidably received in one of said grooves.

6. A structure according to claim 5 wherein said auxiliary member has an F-shaped cross-section including an upright and two arms perpendicular to said upright, said arms defining a groove between them, said upright being slidably accommodated within one of said extension grooves, said auxiliary member groove being opposite to the corner groove closest to said one extension groove, said means defining said closest corner groove and said arms defining a space between them for accommodating the margin of a parition panel.

7. A structure according to claim 5 wherein said auxiliary member has an L-shaped cross-section including an arm slidably accommodated within one of said grooves.

8. A structure according to claim 5 wherein said auxiliary member has a Y-shaped cross-section including a foot and two arms, said foot having a right angle bend between its ends, and one of said arms being slidably accommodated within one of said corner grooves.

9. A structure according to claim 5 wherein said auxiliary member has a U-shaped cross-section, and an element projecting perpendicularly outwardly from one arm of said auxiliary member, said element being slidably accommodated within one of said extension grooves.

References Cited

UNITED STATES PATENTS

| | | | |
|---|---|---|---|
| 1,608,672 | 11/1926 | Rappaport | 52—731 |
| 3,010,547 | 11/1961 | Foster | 52—720 |
| 3,037,591 | 6/1962 | Pulling et al. | 52—498 |
| 3,038,568 | 6/1962 | Morgan | 52—732 |
| 3,101,820 | 8/1962 | Snyder et al. | 52—720 |
| 3,381,434 | 5/1968 | Carson | 52—397 |
| 3,434,258 | 3/1969 | Leurent | 52—498 |
| 2,998,108 | 8/1961 | Stoner et al. | 52—732 |
| 3,435,579 | 4/1969 | Horgan | 52—235 |

FOREIGN PATENTS

| | | | |
|---|---|---|---|
| 1,313,393 | 11/1962 | France | 52—498 |
| 1,319,793 | 1/1963 | France | 52—397 |

HENRY C. SUTHERLAND, Primary Examiner

JAMES LEE RIDGILL, Jr., Assistant Examiner

U.S. Cl. X.R.

52—235, 738